United States Patent
Moteki et al.

(10) Patent No.: US 9,218,537 B2
(45) Date of Patent: Dec. 22, 2015

(54) IMAGE PROCESSING DEVICE AND IMAGE PROCESSING METHOD

(71) Applicant: FUJITSU LIMITED, Kawasaki (JP)

(72) Inventors: Atsunori Moteki, Kawasaki (JP); Takahiro Matsuda, Isehara (JP); Taichi Murase, Kawasaki (JP); Genta Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 295 days.

(21) Appl. No.: 13/956,794

(22) Filed: Aug. 1, 2013

(65) Prior Publication Data

US 2014/0086488 A1   Mar. 27, 2014

(30) Foreign Application Priority Data

Sep. 21, 2012   (JP) ................. 2012-208898

(51) Int. Cl.
| G06T 7/00 | (2006.01) |
| G06K 9/18 | (2006.01) |
| G06K 9/00 | (2006.01) |
| G06T 7/20 | (2006.01) |

(52) U.S. Cl.
CPC ............. *G06K 9/18* (2013.01); *G06K 9/00483* (2013.01); *G06T 7/0081* (2013.01); *G06T 7/204* (2013.01); *G06T 2207/20141* (2013.01)

(58) Field of Classification Search
CPC ...................................................... G06K 9/18
USPC ....................................................... 382/182
See application file for complete search history.

(56) References Cited

U.S. PATENT DOCUMENTS

| 5,444,791 A * | 8/1995 | Kamada et al. ............... 382/190 |
| 6,711,293 B1 | 3/2004 | Lowe |
| 2002/0037100 A1 * | 3/2002 | Toda et al. .................... 382/166 |
| 2005/0129333 A1 * | 6/2005 | Matsuyama et al. .......... 382/295 |
| 2005/0226505 A1 * | 10/2005 | Wilson ........................... 382/180 |
| 2006/0123051 A1 * | 6/2006 | Hofman et al. ............ 707/104.1 |
| 2006/0140481 A1 * | 6/2006 | Kim et al. ..................... 382/190 |
| 2007/0036432 A1 * | 2/2007 | Xu et al. ....................... 382/173 |
| 2008/0007785 A1 * | 1/2008 | Hashii et al. ................. 358/3.01 |

(Continued)

FOREIGN PATENT DOCUMENTS

JP   2009-32109   2/2009

OTHER PUBLICATIONS

Takeda et al., "Real-time document image retrieval system running on a smart phone," The Institute of Electronics, Information and Communication Engineers: Technical Report of IEICE, pp. 1-6 (PRMU2011-104 pp. 31-36).

(Continued)

*Primary Examiner* — Nirav G Patel
*Assistant Examiner* — Delomia Gilliard
(74) *Attorney, Agent, or Firm* — Staas & Halsey LLP

(57) ABSTRACT

An image processing device includes a processor; and a memory which stores a plurality of instructions which, when executed by the processor, cause the processor to execute: acquiring a picked image; selecting pixels, which are adjacent to each other, to be connected based on value of the pixels in the image; generating a pixel connected area which includes the connected pixels; extracting a feature point from an outer edge of the pixel connected area; and calculating a moved amount of the feature point on the basis of the feature point of a plurality of images that have been picked at the first time and the second time by the acquiring.

20 Claims, 15 Drawing Sheets

(56) References Cited

U.S. PATENT DOCUMENTS

| | | | | |
|---|---|---|---|---|
| 2008/0037881 | A1* | 2/2008 | Murashita et al. | 382/232 |
| 2008/0177764 | A1* | 7/2008 | Kise et al. | 707/100 |
| 2010/0054593 | A1* | 3/2010 | Matsushita et al. | 382/167 |
| 2010/0245612 | A1* | 9/2010 | Ohashi et al. | 348/222.1 |
| 2011/0243474 | A1* | 10/2011 | Ito | 382/286 |
| 2013/0016180 | A1* | 1/2013 | Ono | 348/36 |

OTHER PUBLICATIONS

Suzuki et al., "Addition of interactivity to a printed document by information projection using a projector," The Institute of Electronics, Information and Communication Engineers: Technical Report of IEICE, pp. 1-6 (PRMU2011-111 pp. 69-74).

Nobuyuki Otsu, "A Threshold Selection Method from Gray-Level Histograms," IEEE Transactions on Systems, Man, and Cybernetics, vol. SMC-9, No. 1, Jan. 1979, pp. 62-66.

Bradski et al., *Learning OpenCV: Computer vision with the OpenCV library*, "Ch 5: Image Processing," *O'Reilly Media Inc.*, 2008, pp. 115-125.

Harris et al., "A combined corner and edge detector," Proceedings of the Alvey Vision Conference, vol. 15. 1988, pp. 147-151.

Rosten et al., "Machine learning for high-speed corner detection," Proceedings of the 2006 European Conference on Computer Vision, *Computer Vision—ECCV 2006*, 2006, pp. 430-443.

Lucas et al. "An Iterative Image Registration Technique with an Application to Stereo Vision," Proceedings of the 1981 DARPA Imaging Understanding Workshop,*IJCAI*. vol. 81., 1981, pp. 674-679.

Fischler et al.,"Random Sample Consensus: A Paradigm for Model Fitting with Applications to Image Analysis and Automated Cartography." *Communications of the ACM* vol. 24, No. 6, 1981, pp. 381-395.

Kato et al., "Marker Tracking and HMD Calibration for a Video-based Augmented Reality Conferencing System," Proceedings. 2nd IEEE and ACM International Workshop on Augmented Reality, (IWAR '99), IEEE, 1999, pp. 85-94.

* cited by examiner

FIG. 3

| DOCUMENT ID (SPECIFYING INFORMATION) | ADDITIONAL INFORMATION | RELATIVE POSITION [cm] OF ADDITIONAL INFORMATION WITH RESPECT TO REFERENCE POINT |
|---|---|---|
| 1 | Data01.bmp | (6.2 , 12.9) |
| 1 | Data02.bmp | (18.7 , 2.1) |
| 2 | Data03.bmp | (11.8 , 2.0) |
| 3 | Data04.bmp | (1.0 , 23.0) |
| 3 | Data05.bmp | (19.7 , 5.2) |

FIG. 6

| KERNEL SIZE | NUMBER OF BLACK PIXELS | NUMBER OF CHANGED PIXELS | SCREEN SIZE |
|---|---|---|---|
| ... | ... | ... | ... |
| 3 | 46185 | ... | 307200 |
| 5 | 57309 | 11124 | 307200 |
| 7 | 101995 | 44686 | 307200 |
| ... | ... | ... | ... |
| 21 | 50012 | ... | 307200 |
| 22 | 258359 | 8347 | 307200 |
| 23 | 261266 | 2907 | 307200 |
| 24 | 263201 | 1935 | 307200 |
| ... | ... | ... | ... |

FIG. 8

| FEATURE POINT ID | FEATURE POINT POSITION [pixel] | FEATURE QUANTITY (1-D) |
|---|---|---|
| 1 | (100, 150) | 0.345 |
| 2 | (200, 220) | 0.612 |
| 3 | (400, 100) | 0.094 |
| 4 | (300, 50) | 0.023 |
| ... | ... | ... |

FIG. 10

| FEATURE POINT ID AT PREVIOUS TIME (t-1) | FEATURE POINT POSITION AT PREVIOUS TIME (t-1) [pixel] | EXISTENCE OF CORRELATION OF FEATURE POINTS | FEATURE POINT ID AT CURRENT TIME (t) | FEATURE POINT POSITION AT CURRENT TIME (t) [pixel] |
|---|---|---|---|---|
| 1 | (100, 150) | True | 1 | (105, 145) |
| 2 | (200, 220) | True | 2 | (204, 217) |
| 3 | (400, 100) | False | ... | ... |
| 4 | (300, 50) | True | 3 | (303, 51) |
| ... | ... | ... | ... | ... |

FIG. 11

| REFERENCE POINT AT PREVIOUS TIME (t-1) (x_src, y_src) | HOMOGRAPHY | REFERENCE POINT AT CURRENT TIME (t) (x_dst, y_dst) |
|---|---|---|
| (50, 40) | $\begin{pmatrix} 3.4 & 5.2 & 6.7 \\ 5.6 & 6.3 & 3.4 \\ 0.1 & 0.1 & 1.0 \end{pmatrix}$ | (38, 54) |

FIG. 14

| LAYOUT FRAME ID | UPPER LEFT VERTEX COORDINATES [pixel] | LOWER RIGHT VERTEX COORDINATES [pixel] | CHARACTER SIZE [pixel] |
|---|---|---|---|
| 1 | (30, 40) | (130, 150) | 6 |
| 2 | (40, 470) | (150, 410) | 10 |
| 3 | (290, 20) | (380, 110) | 6 |
| ... | ... | ... | ... |

# IMAGE PROCESSING DEVICE AND IMAGE PROCESSING METHOD

CROSS-REFERENCE TO RELATED APPLICATION

This application is based upon and claims the benefit of priority from the prior Japanese Patent Application No. 2012-208898 filed on Sep. 21, 2012, the entire contents of which are incorporated herein by reference.

FIELD

The embodiments discussed herein are related to, for example, an image processing device, an image processing method and an image processing program used to present information regarding to a document.

BACKGROUND

A paper medium has been used to read a document. Nowadays, opportunities to read documents of electronic media have increased with the increase in performance of computers and development of the Internet. An advantage of paper media is that the document may be read in a large size, paper media are low in cost, paper media may be overviewed to grasp the entire text, and so forth. An advantage of electronic media is that dynamically-changing information, such as information on the Internet and moving images, may be displayed, electronic media are easy to carry, and so forth. Then, a new interface that improves a utility value of a document by causing paper media to cooperate with electronic media while utilizing the advantage of paper media has been developed.

Such an interface has a function to pick up an image of a document of a paper medium existing before a user using a camera fixed at an arbitrary position or a movable camera to acquire a document image, and then to display additional information related to the document. Recently, as a technique to display the additional information, an information presenting method using augmented reality (AR) in which additional information is displayed on a document image or a projected paper document in a superimposed manner has been proposed. With the information presenting method, it becomes possible to associate the additional information with a display position on a text image, whereby a paper medium and an electronic medium may be cooperated.

As a related art, for example, a method for picking up an image of a document of a paper medium using a portable terminal, retrieving an electronic document corresponding to the picked document image from a database, and then presenting additional information related to the electronic document to a user is disclosed in Takeda Kazutaka et al., "Real-time document image retrieval on a smartphone", the Institute of Electronics, Information and Communication Engineers, Technical Report of IEICE, PRMU2011-104, pp. 31-36, 2011. A query of retrieval of the electronic document is a document image acquired from a camera mounted on the portable terminal. The additional information is displayed, for example, in a superimposed manner on a display mounted on the portable terminal. A method for displaying additional information on a projected paper document in a superimposed manner using a projector as a device which displays additional information is disclosed in Suzuki Wakana et al., "Addition of interactivity to printed document by information projection using a projector", the Institute of Electronics, Information and Communication Engineers, technical Report of IEICE, PRMU2011-111, pp. 69-74, 2011.

In order not to impair usability, such as feeling of use and operability, by the user when performing the superimposed display of the additional information, a function to continuously display the additional information in the superimposed manner at an appropriate position is desired even in a case in which the relative positional relationship between a document of a paper medium and a camera is changed. In order to implement this function, a technique of tracking a document image for sequentially estimating the relative position and posture of the camera and the document of the paper medium is desired.

As a technique of tracking the document image, there is a method for implementing tracking by extracting characteristic pixel points (feature points), such as endpoints and crosspoints of characters, with respect to the document image, and tracking the positions of the feature points between adjacent frames. For example, feature points are extracted by extracting corner portions of an image using a method called the Harris operator, and the feature points are tracked through optical flow calculation in accordance with the Lucus-Kanade method. Then, the relative position and posture between the camera and the document of the paper medium are estimated on the basis of the entire tracking result of the feature points. A method for hourly updating the display position of the additional information using this estimation result has been disclosed.

SUMMARY

In accordance with an aspect of the embodiments, an image processing device includes a processor; and a memory which stores a plurality of instructions which, when executed by the processor, cause the processor to execute: acquiring a picked image; selecting pixels, which are adjacent to each other, to be connected based on value of the pixels in the image; generating a pixel connected area which includes the connected pixels; extracting a feature point from an outer edge of the pixel connected area; and calculating a moved amount of the feature point on the basis of the feature point of a plurality of images that have been picked at the first time and the second time by the acquiring.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 3 is a table illustrating an exemplary data structure of a document ID (specifying information), additional information, and a relative position of additional information with respect to a reference point;

FIG. 6 is a table illustrating an exemplary data structure including kernel size and the number of changed pixels;

FIG. 8 is a table illustrating an exemplary data structure of feature points which an extracting unit extracts;

FIG. 10 is a table illustrating an exemplary data structure of the feature points correlated by the calculating unit;

FIG. 11 is a table illustrating an exemplary data structure including homography and reference points at each time;

FIG. 14 is a table illustrating an exemplary data structure of an arrangement area.

DESCRIPTION OF EMBODIMENTS

Hereinafter, an image processing device, an image processing method and an image processing program according to embodiments will be described with reference to the drawings. The embodiments are not restrictive to the disclosed technique.

First Embodiment

Figure 1:
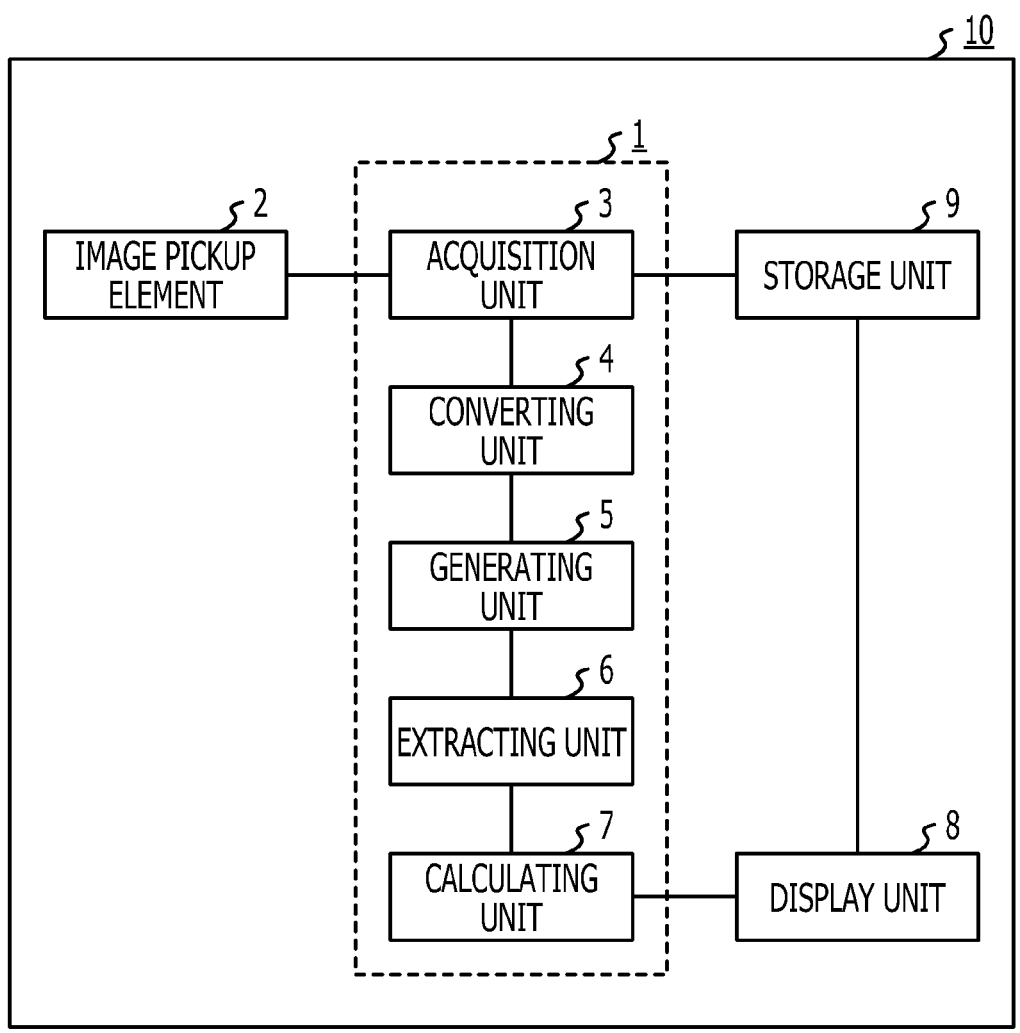
FIG. 1 is a functional block diagram of an information presenting device in which an image processing device according to one embodiment is included.

FIG. 1 is a functional block diagram of an information presenting device 10 in which an image processing device 1 according to one embodiment is included. The information presenting device 10 includes the image processing device 1, an image pickup element 2, a display unit 8 and a storage unit 9. The image processing device 1 includes an acquisition unit 3, a converting unit 4, a generating unit 5, an extracting unit 6 and a calculating unit 7.

The information presenting device 10 is, for example, information equipment used by a user, such as a PC and a portable terminal. The information presenting device 10 further includes a communication unit (not illustrated) which may transmit and receive data between various external devices via communication lines.

The image pickup element 2 is, for example, an image pickup device, such as a charge coupled device (CCD) and a complementary metal oxide semiconductor (CMOS) camera. The image pickup element 2 may be used as a head mounted camera (HMC). For example, the image pickup element 2 picks up an image of a document printed on a paper medium and a marker which uniquely specifies text. The image pickup element 2 is not necessarily included in the information presenting device 10. For example, the image pickup element 2 may be provided in an external device other than the information presenting device 10 via a communication line using a communication unit (not illustrated) which is provided in the information presenting device 10 or in the image processing device 1.

The acquisition unit 3 is, for example, a hardware circuit of a wired logic system. The acquisition unit 3 may be a functional module implemented by a computer program executed in the image processing device 1. The acquisition unit 3 receives a plurality of images at a first time and a second time picked by the image pickup element 2 from the image pickup element 2. The acquisition unit 3 specifies a document ID by detecting a marker included in the image and accessing a storage unit 9 which will be described later. By specifying the document ID, what kind of text the acquisition unit 3 has acquired may be determined uniquely. The document ID may be referred to as specifying information.

The converting unit 4 is, for example, hardware circuit of a wired logic system. The converting unit 4 may be a functional module implemented by a computer program executed in the image processing device 1. The converting unit 4 receives an image from the acquisition unit 3 and converts a plurality of pixels included in the image into binary pixels. In a case in which the image received from the acquisition unit 3 is constituted only by binary pixels, it is not desired that the converting unit 4 converts the pixels into binary pixels. In such a case, the image processing device 1 may select the pixels, which are adjacent to each other, to be connected based on value of the pixels in the image.

Details of a binary pixel conversion process by the converting unit 4 will be described later.

The generating unit 5 is, for example, a hardware circuit of a wired logic system. The generating unit 5 may be a functional module implemented by a computer program executed in the image processing device 1. In either one of binary pixels converted by the converting unit 4, the generating unit 5 connects pixels which are adjacent to each other and generates a pixel connected area which includes the connected pixels. Details of a generation process of the pixel connected area by the generating unit 5 will be described later.

The extracting unit 6 is, for example, a hardware circuit of a wired logic system. The extracting unit 6 may be a functional module implemented by a computer program executed in the image processing device 1. The extracting unit 6 extracts feature points from an outer edge of the pixel connected area generated by the generating unit 5. Details of a feature point extraction process by the extracting unit 6 will be described later.

The calculating unit 7 is, for example, a hardware circuit of a wired logic system. The calculating unit 7 may be a functional module implemented by a computer program executed in the image processing device 1. The calculating unit 7 calculates a moved amount of the feature points extracted by the extracting unit 6 on the basis of a plurality of images picked by the image pickup element 2 at different times. Details of a calculation process of the moved amount of the feature points by the calculating unit 7 will be described later.

The display unit 8 is, for example, a display device, such as a display, a projector and a head mounted display (HMD). The display unit 8 displays, for example, additional information in accordance with the moved amount of the feature points calculated by the calculating unit 7 and in accordance with information regarding position at which the additional information specified by the acquisition unit 3 is to be displayed. The display unit 8 is not necessarily included in the information presenting device 10. For example, the display unit 8 may be provided in an external device other than the information presenting device 10 via a communication line using a communication unit (not illustrated) which is provided in the information presenting device 10 or in the image processing device 1.

The storage unit 9 is, for example, a semiconductor memory device, such as flash memory, or a storage device, such as a hard disk drive (HDD) and an optical disc. The storage unit 9 is not limited to those storage devices described above, and may also be random access memory (RAM) and read only memory (ROM). Various types of data, such as text ID and additional information, are stored in the storage unit 9. The storage unit 9 is not necessarily included in the information presenting device 10. For example, the various types of data may be stored in, for example, cache or memory (not illustrated) of each functional section included in the image processing device 1. The storage unit 9 may be provided in an external device other than the information presenting device 10 via a communication line using a communication unit (not illustrated) which is provided in the information presenting device 10 or in the image processing device 1.

The image processing device 1 may be formed by, for example, an integrated circuit, such as the application specific integrated circuit (ASIC) and field programmable gate array (FPGA).

Figure 2:
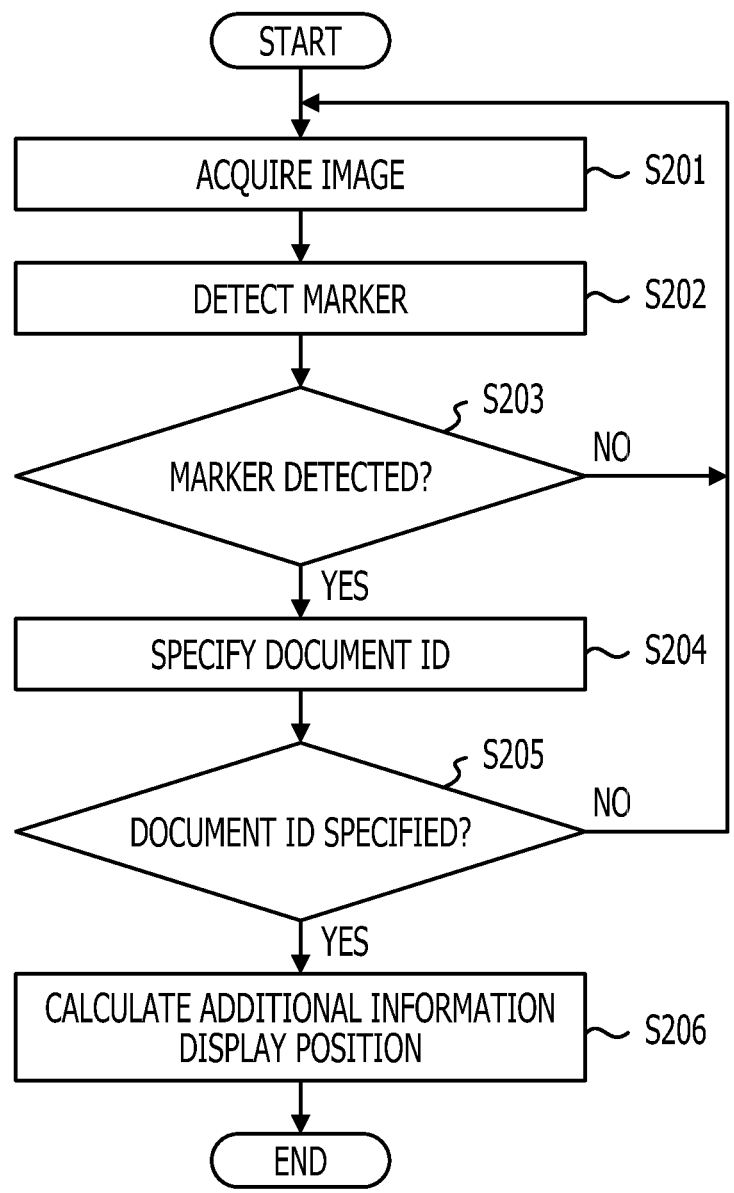
FIG. 2 is a flowchart of initial processing by the image processing device.

FIG. 2 is a flowchart of initial processing by the image processing device 1. It is only desirable that the initial acquisition processing illustrated in FIG. 2 is performed when the user starts using the image processing device 1 (for example, to pick up an image of a first paper medium using the image pickup element 2, or to pick up an image of a second paper medium which is different from the first paper medium). First, the acquisition unit 3 acquires an image picked by the image pickup element 2 (step S201). Here, suppose that an image includes a marker which is used as specifying information for uniquely specifying a document in addition to the document which includes characters and photograph information. For the convenience of description, suppose that characters, photographs and a marker are printed on a paper medium in first embodiment: however, this is not restrictive. For example, the image pickup element 2 may pick up an image of a document image displayed on a display.

The acquisition unit 3 detects a marker from the acquired image (step S202). The method for detecting the marker is described in, for example, Kato Hirokazu and Mark Billinghurst, "Marker Tracking and HMD Calibration for a Video-based Augmented Reality Conferencing System", Proceedings of the 2nd IEEE and ACM International Workshop on Augmented Reality (IWAR '99), pp. 85-94, 1999.

In the first embodiment, the marker is, for example, square-shaped and is disposed such that each side of the marker being in parallel with each side of the paper medium. It is only desirable that the length L [cm] of each side of the marker on the paper medium is a predetermined value. The predetermined value is, for example, 2 cm. In all the documents, coordinates of the upper left vertex of the marker with respect to the paper medium may be the same. The coordinates of the upper left vertex of the marker may be determined by defining coordinate axes in the transverse direction and in the longitudinal direction of the marker as document coordinates.

FIG. 3 is a table illustrating an exemplary data structure of a document ID (specifying information), additional information, and a relative position of additional information with respect to a reference point. The table of FIG. 3 includes a target document ID (specifying information) to which additional information is to be add, additional information, and a relative position of the additional information with respect to the reference point. Here, the additional information is, for example, information such as furigana (kana-letters attached to Chinese characters) included in a document and an URL of moving image content corresponding to a specific character string. It is only desirable that the reference point is set using, for example, the coordinates of the upper left vertex of the above-described marker as reference points. Suppose that the table of FIG. 3 herein is, for example, previously stored in the storage unit 9. Although not illustrated, suppose that patterns of markers to be correlated with the document ID (specifying information) are also stored in the storage unit 9.

In FIG. 2, if no marker has been detected, the acquisition unit 3 acquires an image from the image pickup element 2 again (step S203: No). At this time, the acquisition unit 3 may perform a process to display, on the display unit 8, a message to the user that an image pick-up position is to be changed.

If a marker has been detected (step S203: Yes), the acquisition unit 3 specifies a position I (i, j) [pixel] of the upper left vertex of the marker in the image and the length l [pixel] of each side of the marker in the image. Subsequently, the acquisition unit 3 performs template matching of a pattern drawn inside the marker and the patterns of the markers stored in the storage unit 9.

The acquisition unit 3 specifies a pattern of which similarity is equal to or greater than a predetermined threshold and which is the most similar pattern, and correlates the image acquired by the acquisition unit 3 with the document ID (specifying information) (step S204). In template matching, if the similarity is smaller than the predetermined threshold (step S205: No), the acquisition unit 3 acquires an image from the image pickup element 2 again (step S201).

If the document ID (specifying information) is specified (step S205: Yes), the acquisition unit 3 calculates a display position of the additional information (step S206). The acquisition unit 3 acquires, from the table stored in the storage unit 9 illustrated in FIG. 3, additional information correlated with the target document ID and a relative position of the additional information with respect to the reference point. The display position of the additional information (x, y) [pixel] may be expressed by the following formulae, in which the relative position of the additional information with respect to the reference point is (X, Y) [cm], the length of each side of the marker in the image is l [pixel] and the length of each side of the marker of the paper medium is L [cm].

$$x = i + \frac{X}{L} l \qquad \text{(Math 1)}$$
$$y = j + \frac{Y}{L} l$$

In step S206, as the calculation process of the display position of the additional information by the acquisition unit 3 is completed, the initial processing by the image processing device 1 illustrated in the flowchart of FIG. 2 is completed.

Figure 4:
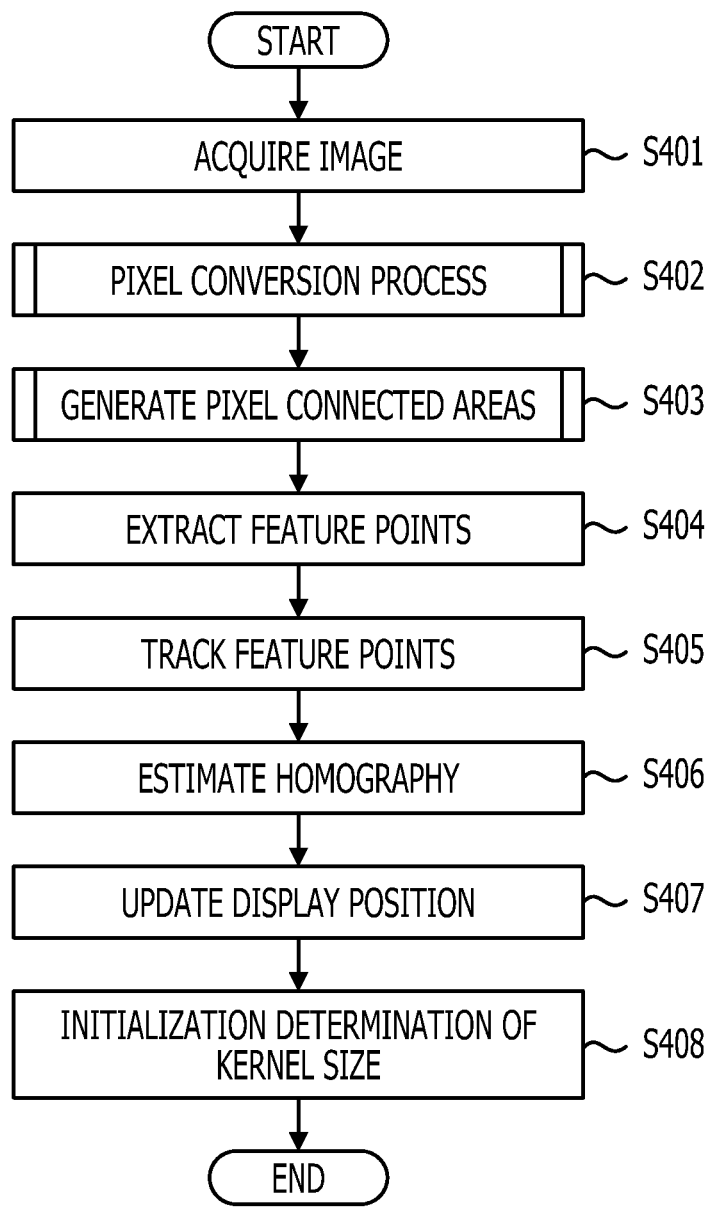
FIG. 4 is a flowchart of sequential processing by the image processing device.

FIG. 4 is a flowchart of sequential processing by the image processing device 1. It is only desirable that the sequential processing illustrated in FIG. 4 is performed, for example, after the initial processing illustrated in FIG. 2 is completed. In FIG. 4, the acquisition unit 3 acquires an image from the image pickup element 2 (step S401).

The converting unit 4 receives the image from the acquisition unit 3 and, if the image includes other than white and black binary pixels, converts the image into grayscale as appropriate. Then, the converting unit 4 converts a plurality of pixels included in the image into binary pixels (step S402). The conversion process into binary pixels (binarization) may be performed by, for example, using the method described in N. Otsu, "A Threshold Selection Method from Grey-Level Histograms", IEEE Transactions on Systems, Man, and Cybernetics, Vol. SMC-9, No. 1, pp. 62-66, 1979.

In either one of binary pixels converted by the converting unit 4, the generating unit 5 connects pixels which are adjacent to each other which are of the same value and generates a pixel connected area which includes the connected pixels (step S403). Here, details of the generation process of the pixel connected area by the generating unit 5 in step S403 will be described.

Figure 5:
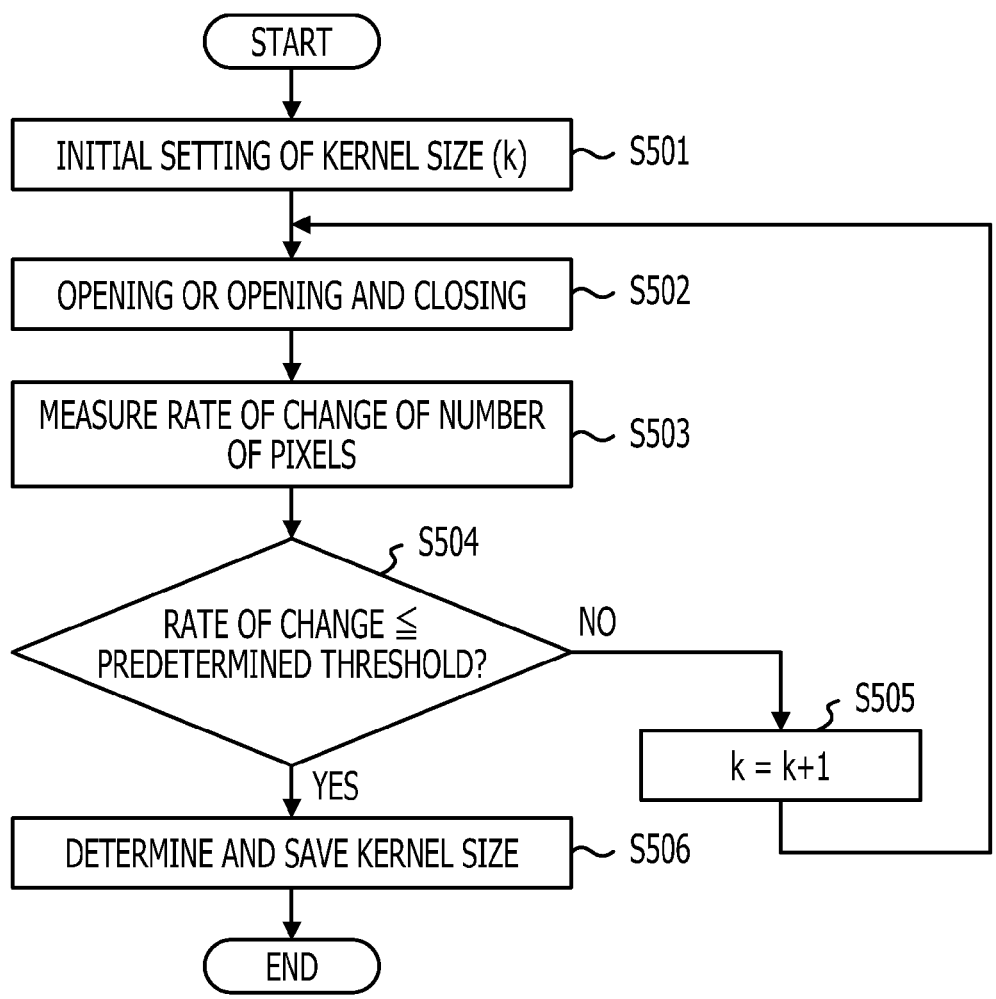
FIG. 5 is a flowchart of a generation process of a pixel connected area by a generating unit.

FIG. 5 is a flowchart of a generation process of a pixel connected area by a generating unit 5. First, the generating unit 5 performs initial setting of the kernel size as a parameter used for the generation of the pixel connected area (step S501). Here, the kernel size represents the size of the processing area in which specific pixels are subject to a dilation process or an erosion process which will be described later. It is only desirable that, in step S501, the initial value (k) of the kernel size is set, for example, to k=1. In step S501, the shape of the kernel size may also be defined. It is only desirable that the shape of the kernel size is, for example, circular or rectangular.

The generating unit 5 performs opening to any of the binary pixels (step S502). Here, the opening is a kind of morphology conversion of image described in Gary Bradski and Adrian Kaehler, "*Learning OpenCV*", O'Reilly Media, 2008. The opening is to perform the dilation processes after performing the erosion processes as many times as the dilation processes have been performed. Here, the erosion process is a process to convert black pixel that have white pixels close thereto into white pixels regarding all the pixels ("the erosion process of white pixels"). The dilation process is a process to convert white pixels that have black pixels close thereto into black pixels ("a dilation process of black pixels"). Here, the definition of the concept "close thereto" is reversed.

When the opening is performed to an image in which characters are included, areas of white pixels between characters are blacked out by areas of black pixels in the erosion process ("the erosion process of white pixels"), whereby the areas between characters are connected by the black pixels. The area of the black pixels dilate into portions between characters and spaces (for example, outer frames of document paragraphs). When the dilation process ("the dilation of black pixels") is performed subsequently, the pixel connected area already connected in the previous erosion process is not changed but the portions between the characters and the spaces which have been dilated are eroded to the shape of the original characters. As a result, by performing the opening, portions inside the paragraph of the document image is blacked out by the black pixels, and the shape of an outer edge of the paragraph includes the feature of the shape of the character close to the outer edge.

The process to perform erosion as many times as dilation is referred to as closing. The closing enables removal of small white voids (areas white pixels gather) produced in the portions inside the paragraphs of the document image. Therefore, the generating unit 5 may perform the opening and closing together in step S502. For the convenience of description, suppose that the generating unit 5 performs only the opening in the first embodiment.

The generating unit 5 measures the rate of change of the number of pixels caused by performing the opening (step S503). The pixels of which rate of change is to be focused on may be any of the white pixels, the black pixels, and the combination of the white pixels and the black pixels. For the convenience of description, suppose that the rate of change of the number of black pixels is measured in the first embodiment. The rate of change of the number of pixels may be defined by, for example, a difference between the number of black pixels in the kernel size k and the number of black pixels in the kernel size k−1. Alternatively, the number of black pixels of all the kernel sizes in a predefined range may be measured, the number of black pixels may be fit by a curved line, and the rate of change of the number of pixels may be measured in accordance with the curvature of the curved line. For the convenience of description, the rate of change of the number of pixels is, for example, the difference in the number of black pixels in the kernel size k and the number of black pixels in the kernel size k−1 in the first embodiment.

The generating unit 5 determines whether the rate of change of the number of pixels is equal to or smaller than a predetermined threshold (step S504). If the rate of change of the number of pixels is greater than the predetermined threshold (step S504: No), the generating unit 5 increments the kernel size by one (step S505) and the routine returns to the process of step S502. If the rate of change of the number of pixels is equal to or smaller than the predetermined threshold (step S504: Yes), the generating unit 5 determines the kernel size and stores the kernel size in, for example, a cache or a memory (not illustrated) of the generating unit 5 (step S506), whereby the generation process of the pixel connected area by the generating unit 5 illustrated in flowchart of FIG. 5 is completed.

In step S504, the predetermined threshold may be arbitrarily determined by simulation or by experiment. It is only desirable that the predetermined threshold is, for example, 9000. If the rate of change of the number of pixels is measured in accordance with the above-described curvature, it is only desirable to use the kernel size of which curvature is the greatest and the number of pixels is equal to or greater than a predetermined number. The predetermined threshold may be a value with which the rate of change of the number of black pixels is equal to or smaller than a predetermined value.

The generation process of the pixel connected area by the generating unit 5 illustrated in the flowchart of FIG. 5 is performed each time the acquisition unit 3 acquires the picked image. In the generation process, by storing the kernel size in step S506, it is possible to use the stored kernel size as an initial kernel size in step S501. This produces an effect that arithmetic operation load of the rate of change of the number of pixels in step S503 is reduced. From viewpoint of calibration, the generating unit 5 may apply a kernel size obtained through decrement by one or two of the stored kernel size as the initial kernel size in step S501.

FIG. 6 is a table illustrating an exemplary data structure including the kernel size and the number of changed pixels. The generating unit 5 generates a data structure including the kernel size and the number of changed pixels illustrated in the table of FIG. 6 by repeating steps S501 to S505 of FIG. 5. Note that, in the table of FIG. 6, a screen size may be stored as the data structure as an additional parameter for threshold decision in step S504 of FIG. 5. For example, if the ratio of the number of black pixels is significantly small for the screen size, the generating unit 5 may skip the determination process of step S504 and proceed to step S505. As illustrated in the table of FIG. 6, as the kernel size increases, it may be understood that the number of black pixels increases. In the table of FIG. 6, the number of changed pixels is expressed by a difference between the number of black pixels in the kernel size i and the number of black pixels in the kernel size i−1 as described above.

Figure 7:
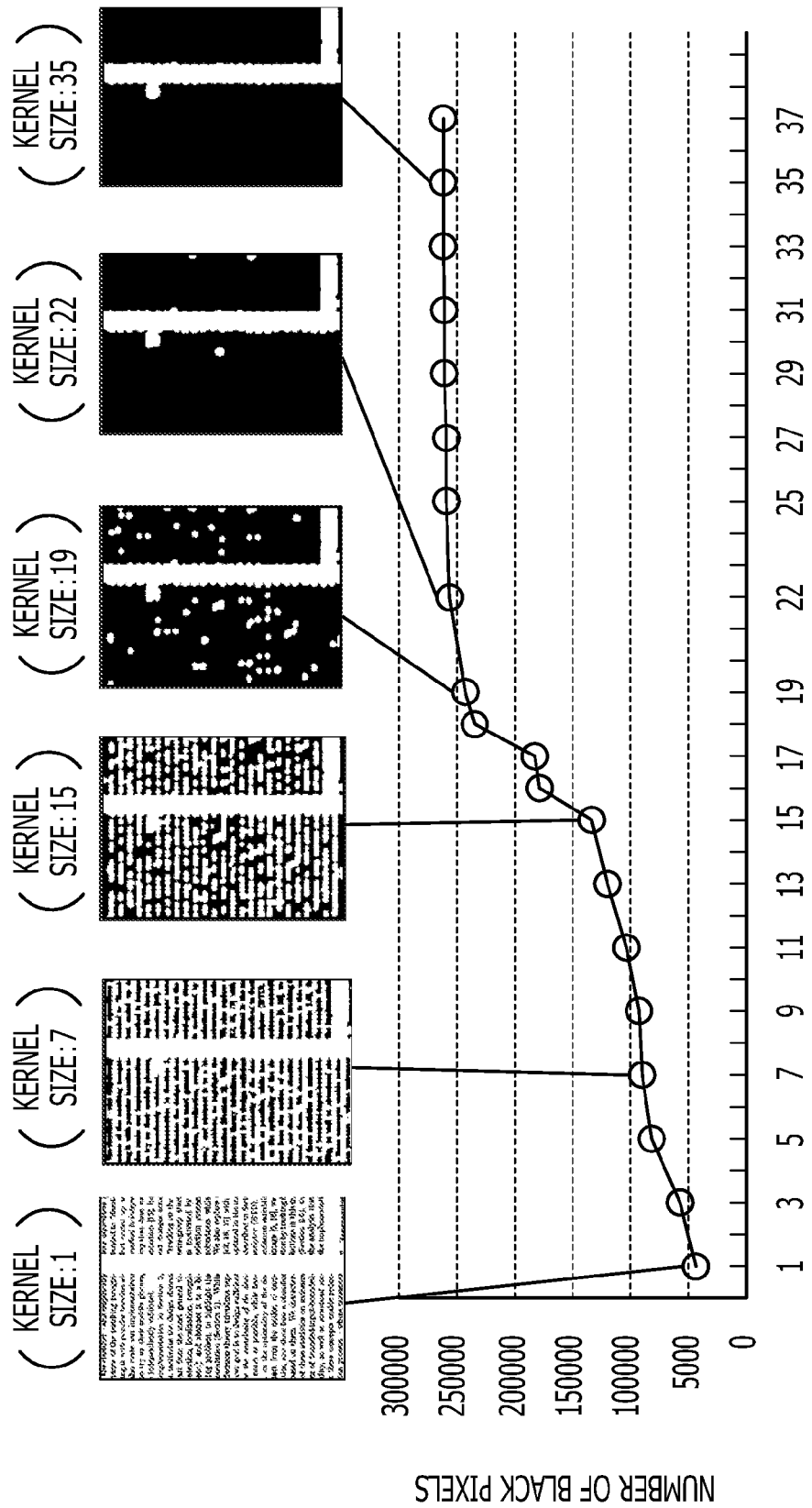
FIG. 7 is a diagram illustrating the kernel size and the number of black pixels.

FIG. 7 is a diagram illustrating the kernel size and the number of black pixels. In FIG. 7, images to which opening has been performed in arbitrary kernel sizes are also illustrated. As illustrated in FIG. 7, since the white pixels between characters of the document image are replaced with the black pixels following the increase in the kernel size, the number of black pixels increases. After the inside of the paragraphs of the document image is blacked out, the interval between the paragraphs is long and thus no replacement with black pixels is performed in the opening. Therefore, the rate of change of the number of black pixels decreases.

The inventors have intensively studied and found that it is desirable that the image after opening has the following three features in order to improve tracking accuracy of feature points.

(1) The pixel connected areas are generated with spaces between the paragraphs of the document image not being blacked out, but spaces, such as character parts in the paragraphs and line spaces, being blacked out.

(2) The pixel connected areas are generated with corners of the paragraphs, such as leading ends and trailing ends of the paragraphs, of the document image being shaped as acute angles.

(3) The pixel connected areas are generated with the outer edges of the paragraphs of the document image including features of the outer edges of the shapes of the characters.

If the kernel size is excessively small (for example, see the kernel size 7 of FIG. 7), such a case is inconsistent with the feature point (1) above: that is the spaces, such as character parts in the paragraphs and line spaces, are not sufficiently replaced with the black pixels. Therefore, confusion in correlation may be caused during tracking the feature points and there is a possibility that incorrect tracking may be performed. On the other hand, if the kernel size is excessively large (see the kernel size 35 of FIG. 7), such a case is inconsistent with the feature points (2) and (3) above: that is, an amount of extraction of the feature points are insufficient. Therefore, there exists a kernel size suitable for the tracking of the feature points. The kernel size suitable for the tracking of the feature points may be defined by the method illustrated by step S504 of FIG. 5. Note that the image after opening may not have all of the feature points (1) to (3) described above; even any one of them may improve the tracking accuracy of the text image.

In FIG. 4, after the generating unit 5 generates the pixel connected area (step S403), the extracting unit 6 extracts the feature points from the outer edges of the pixel connected areas (step S404). In step S404, the extracting unit 6 extracts the feature points from the pixel connected areas generated by the generating unit 5 at the current time t. The feature points may be extracted by using, for example, the Harris operator and FAST configured to detect an overlapped portions (corners) of areas with greater brightness gradient (edge) in an image which are disclosed in C. Harris and M. Stephens, "A combined corner and edge detector", Proceedings of the 4th Alvey Vision Conference, pp. 147-151, 1988 and E. Rosten and T. Drummond, "Machine learning for high-speed corner detection", Proceedings of the 2006 European Conference on Computer Vision, pp. 430-443, 2006. The SIFT which is configured to extract the same feature points even after an image is increased or reduced in size or rotated and which is disclosed in the U.S. Pat. No. 6,711,293 may also be used.

FIG. 8 is a table illustrating an exemplary data structure of feature points which an extracting unit 6 extracts. The table illustrated in FIG. 8 is an exemplary data structure in a case in which feature points are extracted using the Harris operator. Feature point IDs of FIG. 8 are applied arbitrarily in the order in which the extracting unit 6 extracted the feature points. Feature point positions are coordinates positions with, for example, the upper left end of the image acquired by the acquisition unit 3 being an original position. Feature quantity is the 1-D feature quantity obtained using the Harris operator.

Figures 9A, 9B:
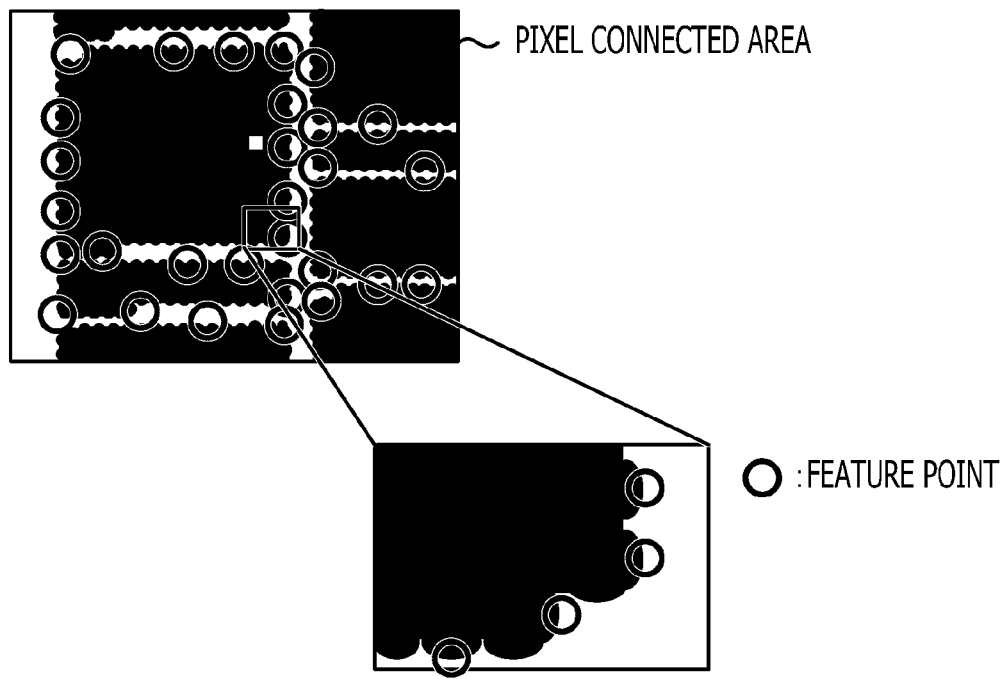
FIG. 9A is a document image which an acquisition unit has acquired.
FIG. 9B is a conceptual diagram of the pixel connected area generated by the generating unit and the feature points extracted by the extracting unit from the pixel connected area.

FIG. 9A is a document image which an acquisition unit 3 has acquired. FIG. 9B is a conceptual diagram of the pixel connected area generated by the generating unit 5 and the feature points extracted by the extracting unit 6 from the pixel connected area. The document image of FIG. 9A includes a plurality of paragraphs. The pixel connected areas of FIG. 9B represent pixel connected areas generated using kernel size 22 illustrated in FIGS. 6 and 7 and feature points extracted from the pixel connected areas. As may understood from FIG. 9B, the conditions of above-described feature points (1) to (3) may be satisfied by using an appropriate kernel size. It becomes possible to improve tracking accuracy of the feature points of the document image by using the feature points of the pixel connected areas which are robust for tracking instead of the feature points of the characters for which tracking of the feature points is easy to fail.

In step S404 of FIG. 4, after the extracting unit 6 performs the extraction process of the feature points, the calculating unit 7 tracks the feature points (step S405). In particular, the calculating unit 7 performs correlation of the feature points extracted at the current time t with the feature points extracted at the previous time t−1 in step S405. That is, the calculating unit 7 measures where the feature points extracted at the previous time t−1 have moved at the current time t. The calculating unit 7 may correlate the feature points by using, for example, an optical flow in accordance with the Lucas-Kanade method disclosed in B. D. Lucas and T. Kanade, "An iterative image registration technique with an application to stereo vision", Proceedings of the 1981 DARPA Imaging Understanding Workshop, pp. 121-130, 1981.

FIG. 10 is a table illustrating an exemplary data structure of the feature points correlated by the calculating unit 7. Since the feature point IDs and the feature point positions are the same as those illustrated in FIG. 8, detailed description thereof will be omitted. As illustrated in table of FIG. 10, the calculating unit 7 refers to the section of "existence of correlation of feature points" and, regarding those feature points with which feature points have not been able to be correlated (tracked), the calculating unit 7 does not perform correlation of the feature points (feature point tracking) thereafter so as to reduce arithmetic load in the feature point tracking of step S405 of FIG. 4.

In step S405 of FIG. 4, after a feature point tracking process by the calculating unit 7 is completed, the calculating unit 7 estimates homography corresponding to the moved amount of the feature points using the feature points correlated at the previous time t−1 and at the current time t (step S406). Here, homography represents a projective transformation matrix H between two planes, which is expressed:

$$H = \begin{pmatrix} h_{11} & h_{12} & h_{13} \\ h_{21} & h_{22} & h_{23} \\ h_{31} & h_{32} & h_{33} \end{pmatrix} \quad \text{(Math 2)}$$

In step S406, four or more sets of corresponding feature points are used for the estimation of homography. If one of the feature points at the previous time t−1 is denoted by p_b=(i_b, j_b) and if one of the feature points at the current time t is denoted by p_p=(i_p, j_p), the projective transformation matrix H satisfies the relationship of the following formula.

$$\begin{pmatrix} i_p \\ j_p \\ 1 \end{pmatrix} = \begin{pmatrix} h_{11} & h_{12} & h_{13} \\ h_{21} & h_{22} & h_{23} \\ h_{31} & h_{32} & h_{33} \end{pmatrix} \begin{pmatrix} i_b \\ j_b \\ 1 \end{pmatrix} \quad \text{(Math 3)}$$

In a case in which the number of corresponding feature points is four, the calculating unit 7 may uniquely determine the homography; in the case in which the number of corresponding feature points is greater than four, the projective transformation matrix H with which a reprojection error (in particular, an error between coordinates of the projected p_b with the calculated H and p_p) is minimized may be calculated. In order to reduce an influence of noise, the calculating unit 7 may use, for example, the RANSAC robust estimation method of disclosed in M. A. Fischler and R. C. Bolles, "Random sample consensus: A paradigm for model fitting with applications to image analysis and automated cartography", Commun. ACM, no. 24, vol. 6, pp. 381-395, 1981.

The calculating unit 7 updates the display position of additional information by updating coordinates of the reference point using the homography as the moved amount of the feature points calculated in step S406 (step S407). Since the homography represents projective transformation from one arbitrary plane to another arbitrary plane, it corresponds to a parallel movement, rotation, an increase and a decrease in size, and an inclination movement between a paper medium and the image pickup element 2. The projective transformation which updates the position of the reference point at the previous time t−1 (x_src, y_src) with the position of the reference point at the current time t (s_dst, y_dst) is expressed by the following formula.

$$x_{dst} = \frac{h_{11}x_{src} + h_{12}y_{src} + h_{13}}{h_{31}x_{src} + h_{32}y_{src} + h_{33}} \quad \text{(Math 4)}$$

$$y_{dst} = \frac{h_{21}x_{src} + h_{22}y_{src} + h_{23}}{h_{31}x_{src} + h_{32}y_{src} + h_{33}}$$

FIG. 11 is a table illustrating an exemplary data structure including the homography and the reference points at each time. The reference point at the current time t is calculated by using the homography as illustrated in the table of FIG. 11. One of the reasons why the reference point changes with time is, for example, that the image pickup element 2 is moved by the user. The calculating unit 7 may calculate the position at which the additional information is to be displayed on the display unit 8 by using the updated reference point and the (Math 1) described above.

In FIG. 4, the calculating unit 7 may perform initialization determination of the kernel size as appropriate (step S408). The initialization determination of the kernel size is a process to determine, for example, whether it is to be desired that the kernel size stored in step S506 of FIG. 5 is initialized due to, for example, any rapid change of distance between the image pickup element 2 and the paper medium. In particular, the calculating unit 7 tracks arbitrary four feature points independent of the document IDs using the homography described above. Then, the calculating unit 7 determines whether the amount of change of a rectangular area having the four feature points has exceeded a predetermined threshold at the previous time t−1 and at the current time t. If the amount of change has exceeded the predetermined threshold, the kernel size is initially set, for example, to 1. This process produces an effect that arithmetic load of the generation process of the pixel connected areas illustrated in the flowchart of FIG. 5 is reduced while accepting rapid position change of the image pickup element 2. After the calculating unit 7 performs the process of step S408 as appropriate, the sequential processing by the image processing device 1 illustrated in the flowchart of FIG. 4 is terminated.

Figure 12A:
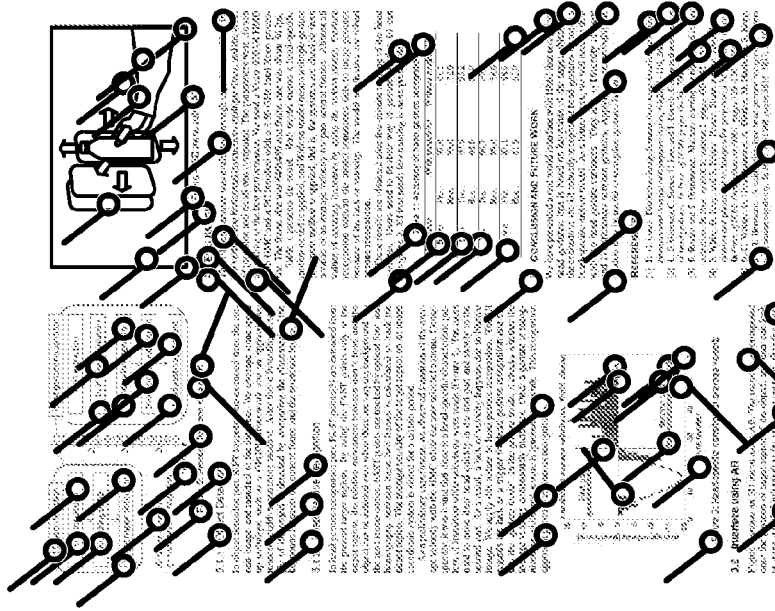
FIG. 12A illustrates a feature point tracking result in a case in which no pixel connected area is generated as an embodiment provided for comparison.
Figure 12B:
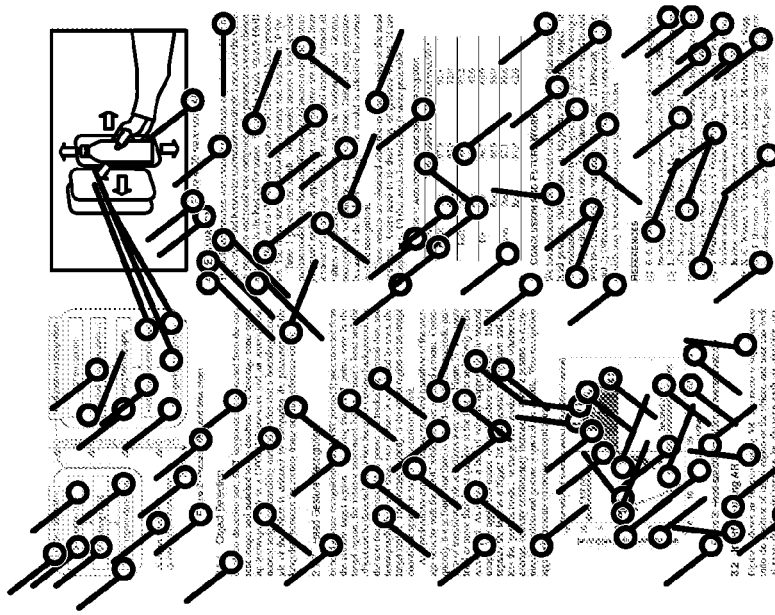
FIG. 12B illustrates a feature point tracking result in a case in which the pixel connected area disclosed in the first embodiment has been generated.

FIG. 12A illustrates a feature point tracking result in a case in which no pixel connected area is generated as comparison. FIG. 12B illustrates a feature point tracking result in a case in which the pixel connected area disclosed in the first embodiment has been generated. In FIGS. 12A and 12B, the image pickup element 2 has performed a parallel movement with respect to the paper medium and a locus of original feature point tracking becomes an upper left direction movement vector. In an embodiment provided for comparison illustrated in FIG. 12A, a locus different from the original locus appears obviously. On the other hand, in the first embodiment illustrated in FIG. 12B, it may be understood that the locus is substantially the same as that of the original locus. This means that the tracking accuracy of the feature points of the document image has been improved.

Second Embodiment

Figure 13:
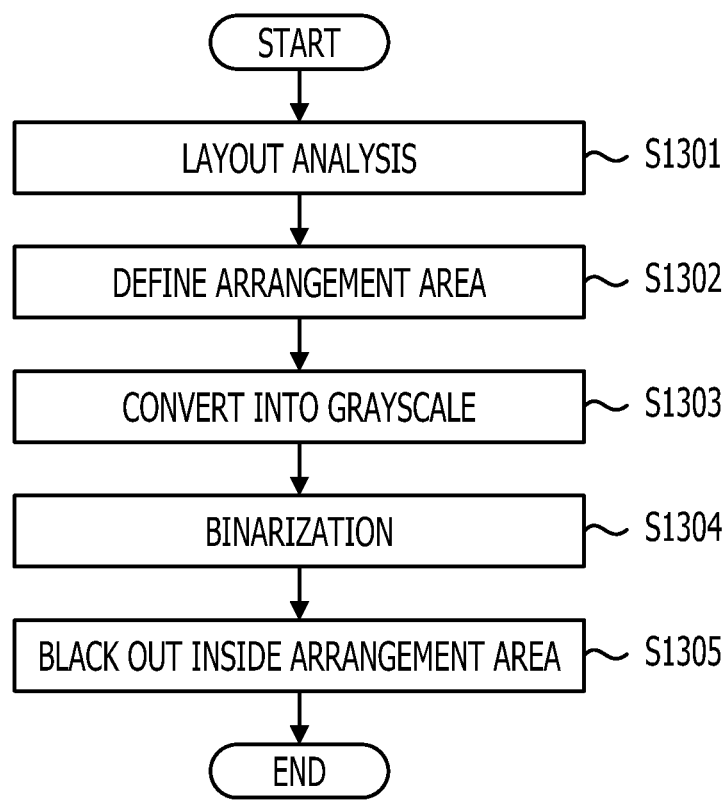
FIG. 13 is a flowchart of a pixel conversion process by a converting unit.

FIG. 13 is a flowchart of a pixel conversion process by a converting unit 4. The process illustrated in the flowchart of FIG. 13 may be replaced with step S402 of FIG. 4. In FIG. 13, the converting unit 4 performs layout analysis to an image acquired by an acquisition unit 3 (step S1301). Here, the layout analysis is analysis of a physical arrangement of document elements (characters, lines, paragraphs, illustration, tables, ruled lines, cells and so forth) of a document image. The layout analysis may be performed by using the method disclosed in, for example, Japanese Patent No. 4443443.

The converting unit 4 defines an arrangement area in accordance with the layout analysis (step S1302). FIG. 14 is a table illustrating an exemplary data structure of the arrangement area. In the table of FIG. 14, layout frame IDs are applied in the order in which, for example, layout frames are detected for each paragraph of the document. Upper left vertex coordinates and lower right vertex coordinates are, for example, positional coordinates with the upper left portion of the image acquired by the acquisition unit 3 being defined as an original position. Suppose that the layout frame is defined by a rectangle in the table of FIG. 14. It is possible to reduce arithmetic load in the generation process of the pixel connected areas illustrated in FIG. 5 by storing character sizes as an indicator for the setting of the kernel size. The character sizes may be used in step S1305 described later.

If the image received from the acquisition unit 3 includes other than white and black binary pixels, the converting unit 4 converts the image into grayscale as appropriate (step S1303). Then, the converting unit 4 converts a plurality of pixels included in the image into binary pixels (step S1304). Next, the converting unit 4 performs black out inside of an arrangement area (step S1305). In the second embodiment, the arrangement area obtained by step S1302 is rectangular in shape. Therefore, in step S1305, the converting unit 4 performs a process to replace all the pixels in an inner area which is not in contact with an outer edge of the arrangement area with black pixels. For example, suppose that the length of each side of the rectangle surrounding a character area of each character obtained by the layout analysis of step S1301 is set to s, the arrangement area is defined as, for example, an area in which an area reduced by s/3 on the inside is to be replaced with the black pixels.

Although it is assumed that white pixels may remain in the pixel connected areas in an opening process in some document images, remaining white pixels may be reduced in the second embodiment. With this, tracking accuracy of the feature points of the document image is further improved.

Third Embodiment

Figure 15:
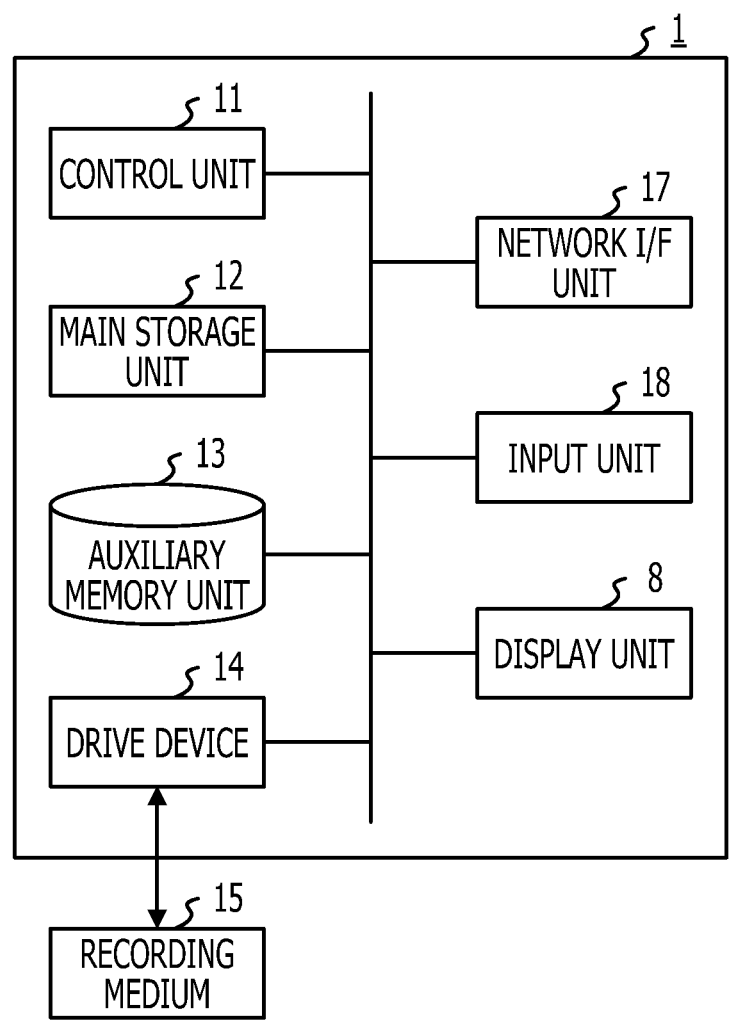
FIG. 15 is a hardware configuration diagram of a computer which functions as an image processing device according to one embodiment.

FIG. 15 is a hardware configuration diagram of a computer which functions as an image processing device 1 according to one embodiment. As illustrated in FIG. 15, the image processing device 1 includes a control unit 11, a main storage unit 12, an auxiliary memory unit 13, a drive device 14, a network I/F unit 17, an input unit 18 and a display unit 8. Each of these devices and units are mutually connected via buses so that data may be transmitted and received therebetween.

The control unit 11 is a CPU which performs control of each device, and operations and processing of data in the computer. The control unit 11 is an arithmetic unit which executes programs stored in the main storage unit 12 and in the auxiliary memory unit 13. The control unit 11 receives data from the input unit 18 and from the storage device, operates and processes the data, and then outputs the data to, for example, the display unit 8 and the storage device.

The main storage unit 12 is, for example, ROM and RAM and is a storage device which temporarily stores programs, such as an OS which is a base software program and application software programs executed by the control unit 11 and data.

The auxiliary memory unit 13 is, for example, a HDD and is a storage device which stores data related to application software programs.

The drive device 14 reads programs from a recording medium 15 which is, for example, a flexible disk and installs the programs in the auxiliary memory unit 13.

Predetermined programs are stored in the recording medium 15 and the programs stored in the recording medium 15 are installed in the image processing device 1 via the drive device 14. The installed predetermined programs becomes executable by the image processing device 1.

The network I/F unit 17 is an interface between peripheral devices having communication function and the image processing device 1. The peripheral devices are connected via a local area network (LAN), a wide area network (WAN) and so forth established by data transmission lines of wired and/or wireless networks.

The input unit 18 includes a keyboard provided with a cursor key, a numeric keypad, various function keypads and so forth, and a mouse and a touchpad used for, for example, key selection on a display screen of the display unit 8. The input unit 18 is a user interface on which, for example, the user provides operation instructions to the control unit 11 and inputs data.

Since the display unit 8 may be implemented by the hardware equivalent to that illustrated in FIG. 1, description thereof will be omitted. Display on the display unit 8 is performed in accordance with display data input from the control unit 11.

An image processing method described above may be implemented as a program to be executed by a computer. The image processing method may be implemented by installing this program from, for example, a server and causing a computer to execute.

It is also possible to record this program on the recording medium 15 and to cause a computer or a portable terminal to read the recording medium 15 on which this program is recorded so as to implement the image processing described above. The recording medium 15 may be various types of recording media, such as recording media like a CD-ROM, a flexible disk and a magneto-optical disc which record information optically, electrically or magnetically, and semiconductor memory like ROM and flash memory which records information electrically.

Each component of each illustrated device may not be physically constituted in the illustrated manner. That is, specific forms of distribution and integration of each device is not limited to those illustrated; each device may be entirely or partially distributed and integrated functionally or physically in an arbitrary unit depending on various load, usage conditions, and so forth. Various processes described in the embodiment may be implemented by executing previously prepared programs by a computer, such as a personal computer and a workstation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
   a processor; and
   a memory which stores a plurality of instructions which, when executed by the processor, cause the processor to execute:
   acquiring a picked image;
   selecting pixels, which are adjacent to each other, to be connected based on value of the pixels in the image;
   generating a pixel connected area which includes the connected pixels, the generating including setting of an initial kernel size as a parameter used for generating the pixel connected area, performing opening on pixels in the initial kernel size, determining a rate of change in a number of pixels in the initial kernel size as a result of the opening, comparing the rate of change to a threshold value, and setting the initial kernel size as a desired kernel size or incrementing the initial kernel size until the desired kernel size is reached based on the comparing;
   extracting a feature point from an outer edge of the pixel connected area; and
   calculating a moved amount of the feature point on the basis of the feature point of a plurality of images that have been picked at the first time and the second time by the acquiring.

2. The device according to claim 1, wherein the instructions, when executed by the processor, further cause the processor to execute:
   converting a plurality of pixels included in the image into binary pixels;
   in either one of binary pixels, connecting pixels which are adjacent to each other and are of the same value.

3. The device according to claim 2,
   wherein the connecting connects pixels which are adjacent to each other by expanding, or by both expanding and contracting, one of the binary pixels.

4. The device according to claim 2,
   wherein the generating repeatedly expands or contracts while changing a size of a processing area to be dilated or eroded and generates the pixel connected area in accordance with a rate of change of the pixels.

5. The device according to claim 1,
wherein the image includes a character; and
wherein an outer edge of the pixel connected area includes a feature of an outer edge of a shape of the character.

6. The device according to claim 1,
wherein the acquiring acquires a reference point included in the image; and
wherein the calculating calculates relative positions of an image pickup element which picks up the image and the reference point on the basis of a moved amount of the feature point.

7. The device according to claim 4,
wherein the generating defines an initial value of the size of the processing area to generate the pixel connected area in accordance with the moved amount of the feature point.

8. The device according to claim 2,
wherein the converting defines an arrangement area of the plurality of pixels with respect to the image and replaces pixels in an inner area which is not in contact with an outer edge of the arrangement area with the pixels which are dilated or eroded.

9. The device according to claim 6, wherein the instructions, when executed by the processor, further cause the processor to execute:
displaying additional information of the image,
wherein the acquiring acquires specifying information which uniquely specifies a respective image included in the plurality of the image; and
wherein the displaying displays the additional information of the image correlated with the specifying information in accordance with the relative position.

10. The device according to claim 9, wherein the instructions, when executed by the processor, further cause the processor to execute:
storing the specifying information and the additional information that accessed at least by the acquiring or the displaying.

11. An image processing method comprising:
acquiring a picked image;
converting a plurality of pixels included in the image into binary pixels;
selecting pixels, which are adjacent to each other, to be connected based on value of the pixels in the image;
generating a pixel connected area which includes the connected pixels, the generating including setting of an initial kernel size as a parameter used for generating the pixel connected area, performing opening on pixels in the initial kernel size, determining a rate of change in a number of pixels in the initial kernel size as a result of the opening, comparing the rate of change to a threshold value, and setting the initial kernel size as a desired kernel size or incrementing the initial kernel size until the desired kernel size is reached based on the comparing;
extracting, by a computer processor, a feature point from an outer edge of the pixel connected area; and
calculating a moved amount of the feature point on the basis of the feature point of a plurality of images that have been picked at the first time and the second time by the acquiring.

12. The method according to claim 11, wherein the instructions, when executed by the processor, further cause the processor to execute:
converting a plurality of pixels included in the image into binary pixels;
in either one of binary pixels, connecting pixels which are adjacent to each other and are of the same value.

13. The method according to claim 12,
wherein the connecting connects pixels which are adjacent to each other by expanding, or by both expanding and contracting, one of the binary pixels.

14. The method according to claim 12,
wherein the generating repeatedly expands or contracts while changing a size of a processing area to be dilated or eroded and generates the pixel connected area in accordance with a rate of change of the pixels.

15. The method according to claim 11,
wherein the image includes a character; and
wherein an outer edge of the pixel connected area includes a feature of an outer edge of a shape of the character.

16. The method according to claim 11,
wherein the acquiring acquires a reference point included in the image; and
wherein the calculating calculates relative positions of an image pickup element which picks up the image and the reference point on the basis of a moved amount of the feature point.

17. The method according to claim 14,
wherein the generating defines an initial value of the size of the processing area to generate the pixel connected area in accordance with the moved amount of the feature point.

18. The method according to claim 12,
wherein the converting defines an arrangement area of the plurality of pixels with respect to the image and replaces pixels in an inner area which is not in contact with an outer edge of the arrangement area with the pixels which are dilated or eroded.

19. The method according to claim 16, wherein the instructions, when executed by the processor, further cause the processor to execute:
displaying additional information of the image,
wherein the acquiring acquires specifying information which uniquely specifies a respective image included in the plurality of the image; and
wherein the displaying displays the additional information of the image correlated with the specifying information in accordance with the relative position.

20. A non-transitory computer-readable storage medium storing image processing program that causing a computer to execute a process comprising:
acquiring a picked image;
converting a plurality of pixels included in the image into binary pixels;
selecting pixels, which are adjacent to each other, to be connected based on value of the pixels in the image;
generating a pixel connected area which includes the connected pixels, the generating including setting of an initial kernel size as a parameter used for generating the pixel connected area, performing opening on pixels in the initial kernel size, determining a rate of change in a number of pixels in the initial kernel size as a result of the opening, comparing the rate of change to a threshold value, and setting the initial kernel size as a desired kernel size or incrementing the initial kernel size until the desired kernel size is reached based on the comparing;
extracting a feature point from an outer edge of the pixel connected area; and calculating a moved amount of the feature point on the basis of the feature point of a plurality of images that have been picked at the first time and the second time by the acquiring.

* * * * *